United States Patent [19]

Heaslip et al.

[11] Patent Number: 5,366,535

[45] Date of Patent: Nov. 22, 1994

[54] BASIC TUNDISH COVERING COMPOUND

[75] Inventors: Lawrence J. Heaslip, Scarborough; James D. Dorricott, Burlington, both of Canada

[73] Assignee: Premier Services Corporation, King of Prussia, Pa.

[21] Appl. No.: 989,057

[22] Filed: Dec. 9, 1992

Related U.S. Application Data

[63] Continuation-in-part of Ser. No. 986,366, Dec. 7, 1992, abandoned.

[51] Int. Cl.$^5$ .............................................. C22B 9/10
[52] U.S. Cl. ...................................................... 75/305
[58] Field of Search .......................................... 75/305

[56] References Cited

U.S. PATENT DOCUMENTS

| | | | |
|---|---|---|---|
| 3,150,966 | 9/1964 | Rossborough | 75/134 |
| 3,396,010 | 8/1968 | Gould | 75/30 |
| 3,926,246 | 12/1975 | Corbett et al. | 164/56 |
| 3,964,916 | 6/1976 | Armistead et al. | 75/94 |
| 4,066,446 | 1/1978 | Peck | 75/96 |
| 4,189,318 | 2/1980 | Zorev | 75/305 |
| 4,235,632 | 11/1980 | Uher et al. | 75/257 |
| 4,430,121 | 2/1984 | Shima | 75/96 |
| 4,490,173 | 12/1984 | Schwer | 75/58 |
| 4,561,894 | 12/1985 | Fontaine et al. | 75/257 |
| 4,594,105 | 6/1986 | Grimm et al. | 75/257 |
| 4,612,046 | 9/1986 | Orcutt | 75/96 |
| 4,738,719 | 4/1988 | McLean et al. | 75/257 |
| 4,842,647 | 6/1989 | Ichikawa et al. | 75/53 |
| 4,853,034 | 8/1989 | Quigley | 75/58 |
| 4,880,463 | 11/1989 | Saad | 75/257 |
| 5,028,257 | 7/1991 | Tomkins et al. | 75/305 |

Primary Examiner—Peter D. Rosenberg
Attorney, Agent, or Firm—Ostrolenk, Faber, Gerb & Soffen

[57] ABSTRACT

A flux composition for use in covering liquid metal includes a non-liquid composition that reacts at the temperature of the liquid metal to form a viscous liquid flux layer in contact with the liquid metal while maintaining a non-liquid layer above the liquid layer.

45 Claims, 1 Drawing Sheet

BASIC TUNDISH COVERING COMPOUND

RELATED APPLICATION

This application is a continuation-in-part of co-pending U.S. patent application Ser. No. 07/986,366 filed Dec. 7, 1992, now abandoned the entire disclosure of which is incorporated by reference herein.

BACKGROUND OF THE INVENTION

1. Field of the Invention

The present invention relates to flux compositions and more particularly to basic flux compositions which are used to cover liquid steel in a transfer vessel such as a continuous casting machine tundish.

2. Description of the Prior Art

In the continuous casting of steel, a tundish is used as an intermediate vessel between a ladle and a mold to provide a reservoir of liquid metal, and to distribute the liquid steel to the mold. It has been recognized that flux compositions can be used to cover the liquid metal in the tundish during the casting operation in order to remove non-metallic inclusions such as silicates and aluminates from the liquid metal, to provide a barrier to reoxidation and to provide thermal insulation.

Heretofore, in order for tundish fluxes to provide all three of the aforementioned functions, different types of fluxes needed to be added to the surface of the liquid steel. A first type of flux was added to the surface of the liquid steel, whereby, it melted to form a basic liquid layer that served to purify the liquid metal by, for example, removing inclusions from the liquid steel. A second type of flux was added to the surface of the liquid steel to form a non-liquid, powdery or granular layer to thermally insulate the liquid steel. In some instances, the second type of flux was added directly to the surface of the first liquid flux layer to form the non-liquid layer above the liquid layer.

Most tundish flux compounds in use today are in the form of powder or larger grains and contain large quantities of silica and carbon. In these compounds, silica content can range from 50%–90% with carbon contents generally in the range of 4%–10%. The presence of free carbon in these materials retards the melting and/or formation of the liquid flux and improves the flow and spreading capability of the material. These materials are insulating, but can lead to contamination of the steel with silicon and silicates, and carbon pickup by the liquid steel.

Other prior art tundish flux compounds which contain lower levels of silica and substitute quantities of magnesia or lime have significant problems with fluidity forming a hard, impenetrable surface layer. This is overcome through the addition of calcium fluoride (spar). These additions, however, are dangerous to the environment as a result of fluorine emission, cause loss of insulation, and substantial refractory erosion.

Prior art tundish flux compounds also do not address the problems associated with high levels of impurities such as iron oxide and manganese oxide in these materials. The presence of iron oxide and manganese oxide leads to oxygen contamination of the steel and, thereby, dirties the steel by creating inclusions.

U.S. Pat. No. 5,028,257 teaches a metallurgical flux composition, however, that composition does not teach a two component system and teaches very high lime/silica and lime+magnesia/silica ratios. The significance of these high base/acid ratios is that the composition will suffer problems with lack of fluidity and, therefore, be unable to form and/or maintain a liquid flux layer for absorption of non-metallic inclusions from the liquid steel. Furthermore, this reference is not taught to contain highly fluxing oxides such as soda, lithia or potassia. Nor is there any mention of limitations on the amount of impurities such as iron oxide or manganese oxide or any teaching of gas evolution when the composition heats up during liquid metal contact to cause the rapid formation of a uniform covering layer to provide insulation and a barrier to reoxidation of the liquid metal.

SUMMARY OF THE INVENTION

Accordingly, it is an object of the present invention to provide a flux composition that is insulating and basic in nature.

Another object is to provide such a flux composition that functions as a two component system in a single package, namely a first component that reacts at the temperature of liquid metals to form a viscous liquid flux layer in contact with the liquid metal while maintaining as a second component a time and temperature stable easily penetrable powdery, fibrous or granular solid layer above the first layer.

A further object is to provide such a flux composition that is non-contaminating with respect to the steel in terms of oxygen, carbon, or silica.

It is also an object to provide such a flux composition that is purifying with respect to its ability to remove non-metallic oxide impurities such as alumina, aluminates, silica, and silicates from the liquid steel.

It is another object to provide such a flux composition wherein both the liquid and granular layers are compatible with respect to basic refractory materials used for tundish linings.

It is a further object to provide such a flux composition that contains no or negligible levels of fluorine, and iron oxide, manganese oxide and other impurities.

It is still a further object to provide such a flux composition that promotes material flow and spreading across the surface of the liquid metal without the need for carbon.

It is still an even further object to provide such a composition that rapidly forms a uniform covering layer to provide insulation and a barrier to reoxidation of the liquid metal.

It has been found that the above and other objects of the present invention are attained in a flux composition for use in covering liquid metal that includes a non-liquid composition that reacts at the temperature of the liquid metal to form a viscous liquid flux layer in contact with the liquid metal while maintaining a non-liquid layer above the liquid layer.

In a preferred embodiment, the composition is both insulating and basic. The liquid layer purifies the liquid metal by removing non-metallic oxide impurities from the liquid metal. The liquid and non-liquid layers, in combination, function to thermally insulate the liquid metal and provide a barrier to reoxidation of the liquid metal. Preferably, the composition evolves a controlled quantity of gas after it contacts the liquid metal to promote material flow and spreading across the surface of the liquid metal.

In a preferred embodiment, a basic flux composition for use in covering liquid metal in a tundish includes, in percent by weight: CaO 40–50%, $SiO_2$ 10–35%, $Al_2O_3$ 0–35%, MgO 5–15%, $Na_2O$ 5–15%, $Fe_2O_3$ 0–1.5%, F 0–0.1%, and C (Free) 0–20%. The CaO to $SiO_2$ ratio is from about 1.1:1 to 5:1, preferably from about 1.3:1 to 2.5:1. The CaO+MgO to $SiO_2$ ratio is from about 1.3:1 to 6.5:1, preferably from about 1.6:1 to 3.1:1.

The composition reacts at the temperature of the liquid metal to form a viscous liquid layer in contact with the liquid metal and a non-liquid layer above the liquid layer. In a preferred embodiment, the composition evolves a controlled quantity of gas after it contacts the liquid metal to promote material flow and spreading across the surface of the liquid metal. Preferably, the gas is carbon dioxide.

In a preferred embodiment, the composition is a mixture of powders, granules and/or fibers. Preferably, the composition includes 8–10% by weight ceramic fiber.

In a preferred embodiment, the composition is a mixture of materials and at least 50% of the materials have a melting point higher than the melting point of the liquid metal. Preferably, about 75–85% of the materials have a melting point higher than the melting point of the liquid metal, and the mixture includes low melting point fluxing materials that include combined gas. Preferably, the combined gas is carbon dioxide.

In a preferred embodiment, a basic flux composition for use in covering liquid metal in a tundish includes, in percent by weight: CaO 40–50%, $SiO_2$ 20–30%, $Al_2O_3$ 0–10%, MgO 8–12%, $Na_2O$ 9–12%, $Fe_2O_3$ 0–1.5%, and C 0–7%.

Other features and advantages of the present invention will become apparent from the following description of the invention which refers to the accompanying drawing.

BRIEF DESCRIPTION OF THE DRAWING

For the purpose of illustrating the invention, there is shown in the drawings an embodiment which is presently preferred; it being understood, however, that the invention is not limited to the precise arrangements and instrumentalities shown.

DETAILED DESCRIPTION OF THE INVENTION

Figure 1:
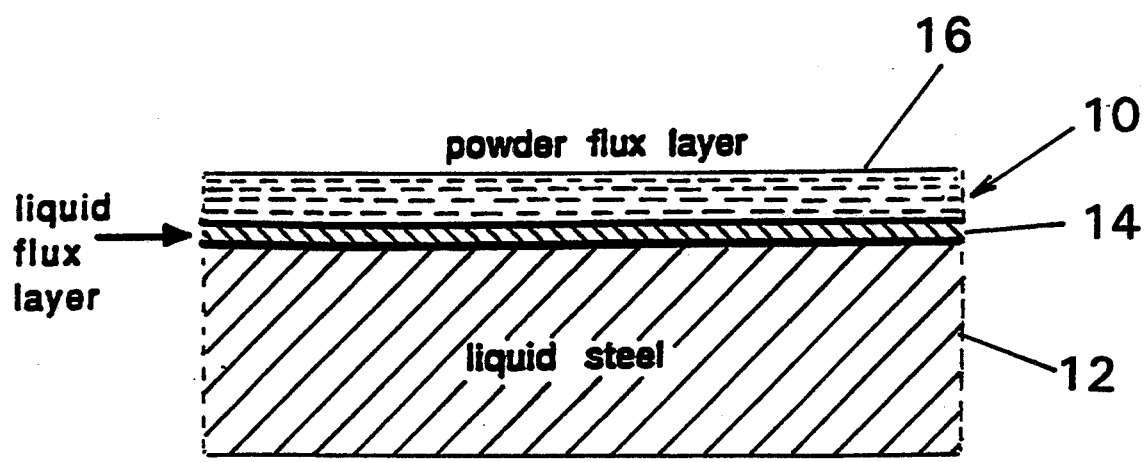
FIG. 1 is a representation of the flux composition of the present invention functioning as a two component system when it is spread across the surface of liquid metal.

The flux composition of the present invention is an intimate and homogenous mixture of powdery, granular and/or fibrous materials that function as a two component system in a single composition or package. The composition is both insulating and basic and performs the following three vital functions as it covers the liquid metal in a tundish: 1) thermal insulation of the liquid steel, 2) provision of a barrier to reoxidation, and 3) the assimilation of slag and inclusions, thereby, cleansing the steel.

These functions are accomplished through the formation of both a liquid and a granular, powder and/or fibrous layer above the liquid steel from a single package of material. Referring now to FIG. 1, there is shown the flux composition of the present invention 10 spread across the surface of liquid metal 12 contained in a tundish, not shown. The flux composition 10 has reacted with the liquid metal 12 to form two components, namely a liquid flux layer 14 and an easily penetrable non-liquid flux layer 16. The non-liquid flux layer 16 can be of a fibrous, powdery or granular form.

The non-liquid layer 16 and the liquid layer 14, in combination, function to thermally insulate the liquid steel 12 and to provide a barrier to reoxidation of the liquid steel 12. The liquid layer 14 functions to assimilate non-metallic inclusions, thereby, cleansing the steel, for example, by removing oxide impurities such as alumina, aluminates, silica, and silicates from the liquid steel.

The flux composition of the present invention should contain in its bulk chemical analysis the following components: lime (CaO) and/or strontia (SrO), silica ($SiO_2$), alumina ($Al_2O_3$), fluxing oxides such as soda, lithia and/or potassia ($Na_2O$, $Li_2O$ and/or $K_2O$), magnesia (MgO), and gas (principally $CO_2$).

It has been found that the composition for the tundish flux of the present invention is as follows, in percent by weight after fusion (melting):

| | |
|---|---|
| CaO | 40–50% |
| $SiO_2$ | 10–35% |
| $Al_2O_3$ | 0–35% |
| MgO | 5–15% |
| $Na_2O$ | 5–15% |
| $Fe_2O_3$ | 0–1.5% |
| F | 0–0.1% |
| C | 0–20% |

The ranges of the components can be varied. For example, the flux composition can be 41–50% or 46–50% by weight CaO, 10–19% by weight $SiO_2$, 11–35% by weight $Al_2O_3$ and/or 11–15% by weight MgO.

A preferred composition of the tundish flux of the present invention, after fusion, is as follows:

| | |
|---|---|
| CaO | 40–50% |
| $SiO_2$ | 20–30% |
| $Al_2O_3$ | 0–10% |
| MgO | 8–12% |
| $Na_2O$ | 9–12% |
| $Fe_2O_3$ | 0–0.5% |
| F | 0% |
| C | 0–7% |

The ranges of the components can be varied as demonstrated above.

The materials that comprise the flux composition of the present invention are specifically chosen and mixed in the correct proportions to provide the bulk chemistries as described above. The choice of materials controls the melting behavior of the mixture. Specifically, at least 50% of the mixture, preferably 75%–85%, should be comprised of materials each of which has a melting point (i.e. the temperature where the first liquid appears upon heating the individual material) higher than the temperature of the liquid metal with which the compound is to be contacted. In the case of liquid steel in a tundish, the temperature range is typically 2700° F. to 2850° F. Thus, at least 50% of the mixture should be comprised of materials having melting points above 2700° F.

In a typical embodiment, these materials include the following: for the provision of the CaO, cements and refractory cements, burnt dolomite, burnt lime, limestone, or other high melting point materials containing typically at least 50% CaO by weight; for the provision of $SiO_2$, high silica sands, quartz, burnt rice hull ash, or other high melting point materials containing typically at least 75% $SiO_2$ by weight; for the provision of MgO, dolomite, burnt dolomite, magnesitic minerals, or other high melting point materials containing typically at least 40% MgO by weight; for the provision of $Al_2O_3$, calcium aluminates, refractory alumina grain, refractory fiber, or other high melting point materials containing typically at least 60% $Al_2O_3$ by weight; for the provision of carbon, carbon sand and graphite or other high melting point materials containing typically at least 80% carbon by weight. The remainder of the mixture should be comprised of relatively low melting point fluxing agents such as dense soda ash and/or glass cullet, or other low melting point fluxing materials such as nepheline, potash, lithia, and lithium carbonate.

The fluxing materials should contain combined gas such as carbon dioxide which will be liberated quickly when the compound heats up during liquid metal contact. This is an important feature of the present invention. Gas-evolving granules aid in protection from oxidation, improve material flowability on the liquid steel surface and improve the insulation characteristics.

A controlled quantity of the gas is evolved during heating and melting of the flux composition on the surface of the liquid steel in the tundish. The gas evolution promotes material flow in spreading across the surface without the need for carbon. This causes the rapid formation of a uniform covering layer to provide thermal insulation and a barrier to reoxidation of the liquid metal. It has been found that gas content in the range of 4–10%, preferably 4–8%, by weight before fusion is sufficient to provide this behavior.

While it has been found that the inclusion of free carbon in the flux composition of the present invention is not required to promote flow and spreading across the liquid metal surface, it is also not required to improve the protection performance of the flux composition as regards reoxidation of the liquid metal. In the absence of free carbon in the flux composition, the covered liquid metal suffers no contamination by carbon, in which case, for example, ultra low carbon steel may be covered with the flux composition without difficulty. In the production of higher carbon steel in which some degree of carbon contamination is tolerable, free carbon may be included in the flux composition of the present invention without detrimental effect. In these cases, it has been found that with the inclusion of 3–20%, preferably 5–15%, by weight free carbon in the flux composition in powder or granular form with a particle size larger than that required to pass a standard 140 mesh screen, a non-liquid carbon-enriched layer is formed between the viscous liquid flux layer and the largely unaffected non-liquid flux layer above, improving the stability of the two layers and minimizing the contamination of the liquid metal by carbon.

The flux composition of the present invention is preferably an intimate, homogenous mixture of powdery and/or granular materials. The mixture can take either or both of these forms by employing any of the known methods. For example; to achieve a powdery mixture, the raw materials can be ordered in this form. To achieve a granular mixture, common granularization or pelletization techniques can be used.

It has been found that the insulating properties of the flux composition can be improved by the inclusion of oxide fibers within the physical matrix of the mix. The inclusion of fibers lowers the bulk density and may decrease the melting rate. The fibers may be added in some proportion as a raw material to the mixture, approximately 8–10% or more by weight, or the mixture or part of the mixture can be fiberized by any of the known methods.

It is important that the base/acid ratios of the flux compositions of the present invention are carefully adjusted to control fluidity, i.e. to form and maintain a liquid flux layer for absorption of non-metallic inclusions from the liquid steel, to maintain good insulation and to be compatible with basic tundish practices. If the base/acid ratio is too low the composition will suffer problems with excessive fluidity and, thereby, heat loss from the liquid metal (poor insulation). Also, a low base/acid ratio will not lead to cleansing of the liquid metal and will be incompatible with, and cause corrosion of, basic tundish refractory lining materials. If the base/acid ratio is too high, the composition will suffer problems with lack of fluidity and, therefore, will be unable to form and/or maintain a liquid flux layer for absorption of non-metallic inclusions from the liquid steel.

The base/acid ratio (lime/silica) in the flux composition of the present invention is carefully adjusted to maintain good fluidity and appropriate melting behavior, to maintain good insulation, and to be compatible with basic tundish practices. The base/acid ratio should be approximately 1.1:1 to 5:1, 1.1:1 to 3.4:1, or 2.3:1 to 5:1; preferably 1.3:1 to 2.5:1. The modified base/acid ratio (lime+magnesia/silica) should be approximately 1.3:1 to 6.5:1 or 2.8:1 to 6.5:1; preferably 1.6:1 to 3.1:1.

Unlike other prior art basic tundish covering compounds, the flux composition of the present invention contains no or negligible contents of fluorine, (0–0.1%). It has been found that at the base/acid ratios set forth above, fluorine is not required, e.g. as $CaF_2$ (spar), in the presence of highly basic agents such as sodium, lithium or potassium oxides to provide and maintain a sufficiently fluid layer for inclusion or dirt removal from the steel. Fluorine has been found to be erosive to tundish refractories. Fluorine emissions are also a safety problem.

It is also important that the covering compound be suitable for long term contact with the liquid metal and refractories of the tundish. Therefore, a low iron oxide content of less than 1.5% is of particular significance so that the metal does not suffer oxygen or oxide contamination which ditties the steel by creating inclusions. The MgO content of the flux composition of the present invention ensures its compatibility with basic tundish refractories and low oxygen clean steel practice. The liquid layer of the composition can easily absorb both aluminate and silicate inclusions. Ultra-low carbon steels and low silicon steels may be produced without contamination.

The following examples will serve to illustrate the invention:

Flux compositions according to the present invention were prepared in powder form from a mixture of the raw materials cements and refractory cements, dense soda ash, glass, burnt dolomite, and ceramic fibers to provide the following three compositions in percent, by weight after fusion:

| Example 1 | |
| --- | --- |
| MgO | 10.5% |
| CaO | 45.3% |
| $Na_2O$ | 10.4% |
| $Al_2O_3$ | 6.5% |
| $SiO_2$ | 25.4% |
| C | 0.0% |

|   | -continued | |
|---|---|---|
|   | Gas content (before fusion) | 4.8% |
| impurities | F | 0.0% |
|   | Fe$_2$O$_3$ | 0.5% |
|   | Others | 1.4% |
|   | Example 2 | |
|   | MgO | 8.5% |
|   | CaO | 48.8% |
|   | Na$_2$O | 11.2% |
|   | Al$_2$O$_3$ | 6.8% |
|   | SiO$_2$ | 22.9% |
|   | C | 0.0% |
|   | Gas content (before fusion) | 6.2% |
|   | ceramic fiber | 8.0% |
| impurities | F | 0.0% |
|   | Fe$_2$O$_3$ | 0.4% |
|   | Others | 1.4% |
|   | Example 3 | |
|   | MgO | 8.9% |
|   | CaO | 42.3% |
|   | Na$_2$O | 10.0% |
|   | Al$_2$O$_3$ | 8.1% |
|   | SiO$_2$ | 28.8% |
|   | C | 0.0% |
|   | Gas content (before fusion) | 4.2% |
| impurities | F | 0.0% |
|   | Fe$_2$O$_3$ | 0.5% |
|   | Others | 1.4% |

The fusion characteristics of each of these examples, i.e. the temperature when the flux composition in contact with the liquid metal starts to melt and the first liquid flux layer begins to form, are as follows: Example 1–1320° C. (2408° F.), Example 2–1340° C. (2444° F.), and Example 3–1250° C. (2282° F.).

Each of the flux compositions when applied to the surface of liquid metal contained in a tundish were found to be insulating and basic in nature, to react at the temperature of the liquid steel to form a viscous liquid flux layer in contact with the metal while maintaining a time and temperature stable easily penetrable non-liquid layer above, and were found to be non-contaminating with respect to the steel in terms of oxygen, carbon or silica, and purifying with respect to the compositions ability to remove oxide impurities, such as alumina, aluminates, silica and silicates from the liquid steel. The liquid and non-liquid layers of each of the compositions were also found to be compatible with respect to the basic refractory materials of the tundish linings and contained no or negligible levels of fluorine, and iron oxide, manganese oxide and other impurities. The flux compositions evolved a controlled quantity of carbon dioxide gas to promote material flow and spreading across the surface of the liquid metal and rapidly formed a uniform covering layer to provide insulation and a barrier to reoxidation of the liquid metal.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A flux composition for use in covering liquid metal comprising a non-liquid composition that melts, when contacted with the liquid metal, to form a liquid flux layer in contact with the liquid metal while maintaining a non-liquid layer above the liquid flux layer, the liquid flux layer having a viscosity greater than the viscosity of the liquid metal.

2. The flux composition of claim 1, wherein the composition is both insulating and basic.

3. The flux composition of claim 2, wherein the liquid layer purifies the liquid metal.

4. The flux composition of claim 3, wherein the liquid layer removes non-metallic oxide impurities from the liquid metal.

5. The flux composition of claim 2, wherein the liquid and non-liquid layers, in combination, function to thermally insulate the liquid metal and provide a barrier to reoxidation of the liquid metal.

6. The flux composition of claim 2, wherein the composition evolves a controlled quantity of gas after it contacts the liquid metal to promote material flow and spreading across the surface of the liquid metal.

7. A basic flux composition for use in covering liquid metal in a tundish comprising, in percent by weight:

| CaO | 40–50% |
|---|---|
| SiO$_2$ | 10–35% |
| Al$_2$O$_3$ | 0–35% |
| MgO | 5–15% |
| Na$_2$O | 5–15% |
| Fe$_2$O$_3$ | 0–1.5% |
| F | 0–0.1% |
| C (Free) | 0–20%. |

8. The flux composition of claim 7, wherein the CaO to SiO$_2$ ratio is from about 1.1:1 to 5:1.

9. The flux composition of claim 7, wherein the CaO to SiO$_2$ ratio is from about 1.3:1 to 2.5:1.

10. The flux composition of claim 7, wherein the CaO+MgO to SiO$_2$ ratio is from about 1.3:1 to 6.5:1.

11. The flux composition of claim 7, wherein the CaO+MgO to SiO$_2$ ratio is from about 1.6:1 to 3.1:1.

12. The flux composition of claim 7, wherein the composition reacts at the temperature of the liquid metal to form a viscous liquid layer in contact with the liquid metal and a non-liquid layer above the liquid layer.

13. The flux composition of claim 12, wherein the composition evolves a controlled quantity of gas after it contacts the liquid metal to promote material flow and spreading across the surface of the liquid metal.

14. The flux composition of claim 13, wherein the gas is carbon dioxide.

15. The flux composition of claim 7, wherein the composition is a mixture of powders, granules or fibers.

16. The flux composition of claim 7, wherein the composition is a mixture of at least two materials selected from the group consisting of powders, granules and fibers.

17. The flux composition of claim 7, wherein the composition includes 8–10% by weight ceramic fiber.

18. The flux composition of claim 7, wherein the composition is a mixture of materials and at least 50% of the materials have a melting point higher than the melting point of the liquid metal.

19. The flux composition of claim 18, wherein about 75–85% of the materials have a melting point higher than the melting point of the liquid metal.

20. The flux composition of claim 18, wherein the mixture includes low melting point fluxing materials that include combined gas.

21. The flux composition of claim 20, wherein the combined gas is carbon dioxide.

22. A basic flux composition for use in covering liquid metal in a tundish comprising, in percent by weight:

| | |
|---|---|
| CaO | 40–50% |
| $SiO_2$ | 20–30% |
| $Al_2O_3$ | 0–10% |
| MgO | 8–12% |
| $Na_2O$ | 9–12% |
| $Fe_2O_3$ | 0–1.5% |
| C | 0–7% |
| F | 0–0.1% |

23. The flux composition of claim 22, wherein the CaO to $SiO_2$ ratio is from about 1.1:1 to 5:1.

24. The flux composition of claim 22, wherein the CaO to $SiO_2$ ratio is from about 1.3:1 to 2.5:1.

25. The flux composition of claim 22, wherein the CaO+MgO to $SiO_2$ ratio is from about 1.3:1 to 6.5:1.

26. The flux composition of claim 22, wherein the CaO+MgO to $SiO_2$ ratio is from about 1.6:1 to 3.1:1.

27. The flux composition of claim 22, wherein the composition reacts at the temperature of the liquid metal to form a viscous liquid layer in contact with the liquid metal and a non-liquid layer above the liquid layer.

28. The flux composition of claim 27, wherein the composition evolves a controlled quantity of gas after it contacts the liquid metal to promote material flow and spreading across the surface of the liquid metal.

29. The flux composition of claim 28, wherein the gas is carbon dioxide.

30. The flux composition of claim 22, wherein the composition is a mixture of powders, granules or fibers.

31. The flux composition of claim 22, wherein the composition is a mixture of at least two materials selected from the group consisting of powders, granules and fibers.

32. The flux composition of claim 22, wherein the composition includes 8–10% by weight ceramic fiber.

33. The flux composition of claim 22, wherein the composition is a mixture of materials and at least 50% of the materials have a melting point higher than the melting point of the liquid metal.

34. The flux composition of claim 33, wherein about 75–85% of the materials have a melting point higher than the melting point of the liquid metal.

35. The flux composition of claim 22, wherein the mixture includes low melting point fluxing materials that include combined gas.

36. The flux composition of claim 35, wherein the combined gas is carbon dioxide.

37. A basic flux composition for use in covering liquid metal in a tundish comprising, in percent by weight:

| | |
|---|---|
| CaO | 40–50% |
| $SiO_2$ | 10–19% |
| $Al_2O_3$ | 0–10% |
| MgO | 8–12% |
| $Na_2O$ | 9–12% |
| $Fe_2O_3$ | 0–1.5% |
| C | 0–7%. |

38. A basic flux composition for use in covering liquid metal in a tundish comprising, in percent by weight:

| | |
|---|---|
| CaO | 46–50% |
| $SiO_2$ | 20–30% |
| $Al_2O_3$ | 0–10% |
| MgO | 8–12% |
| $Na_2O$ | 9–12% |
| $Fe_2O_3$ | 0–1.5% |
| C | 0–7%. |

39. A basic flux composition for use in covering liquid metal in a tundish comprising, in percent by weight:

| | |
|---|---|
| CaO | 40–50% |
| $SiO_2$ | 20–30% |
| $Al_2O_3$ | 0–10% |
| MgO | 11–15% |
| $Na_2O$ | 9–12% |
| $Fe_2O_3$ | 0–1.5% |
| C | 0–7%. |

40. The flux composition of claim 1, wherein the liquid metal is steel.

41. The flux composition of claim 7, wherein the liquid metal is steel.

42. The flux composition of claim 22, wherein the liquid metal is steel.

43. The flux composition of claim 37, wherein the liquid metal is steel.

44. The flux composition of claim 38, wherein the liquid metal is steel.

45. The flux composition of claim 39, wherein the liquid metal is steel.

* * * * *